United States Patent [19]

Helt et al.

[11] Patent Number: 5,271,556
[45] Date of Patent: Dec. 21, 1993

[54] INTEGRATED FURNACE CONTROL

[75] Inventors: Robert W. Helt, Tyler; Carl L. Garrett, Whitehouse; James T. Vershaw, Tyler, all of Tex.

[73] Assignee: American Standard Inc., New York, N.Y.

[21] Appl. No.: 934,998

[22] Filed: Aug. 25, 1992

[51] Int. Cl.⁵ .................................... F24D 5/00
[52] U.S. Cl. ......................... 236/11; 236/1 E
[58] Field of Search ........... 236/11, 1 E, 1 EA, 1 EB, 236/1 ER; 62/196.2, 228.5, 176.6, 173

[56] References Cited

U.S. PATENT DOCUMENTS

| | | | |
|---|---|---|---|
| 4,090,370 | 5/1978 | Vaughan | 236/44 C |
| 4,325,224 | 4/1982 | Howland | 236/1 EA |
| 4,638,942 | 1/1987 | Ballard et al. | 236/10 |
| 4,789,330 | 12/1988 | Ballard et al. | 431/75 |
| 4,887,767 | 12/1989 | Thompson et al. | 236/1 |
| 4,976,459 | 12/1990 | Lynch | 236/11 |
| 4,982,721 | 1/1991 | Lynch | 126/116 |
| 5,022,460 | 6/1991 | Brown | 165/12 |
| 5,027,789 | 7/1991 | Lynch | 126/116 |
| 5,074,780 | 12/1991 | Erdman | 431/24 |
| 5,076,780 | 12/1991 | Erdman | 431/24 |

Primary Examiner—Harry B. Tanner
Attorney, Agent, or Firm—William J. Beres; William O'Dricoll; Peter D. Ferguson

[57] ABSTRACT

An HVAC controller including a first input; a second input; first means, responsive to a first signal received on the first input, for generating a first mode of operation; second means, responsive to a second signal received on the second input, for generating a second mode of operation; and third means, responsive to a third signal received substantially simultaneously on the first and second inputs, for generating a third mode of operation.

14 Claims, 11 Drawing Sheets

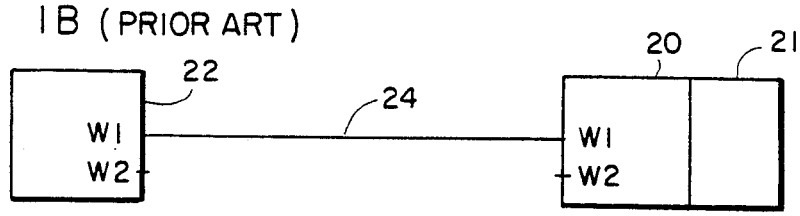
FIG. 1B (PRIOR ART)
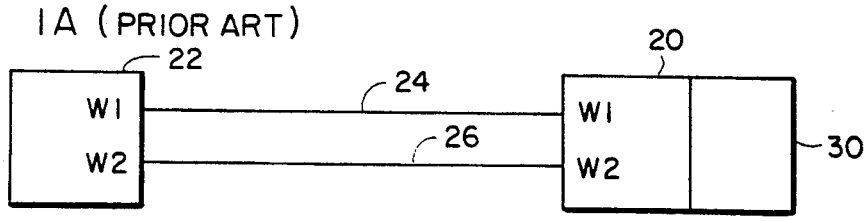
FIG. 1A (PRIOR ART)
FIG. 2
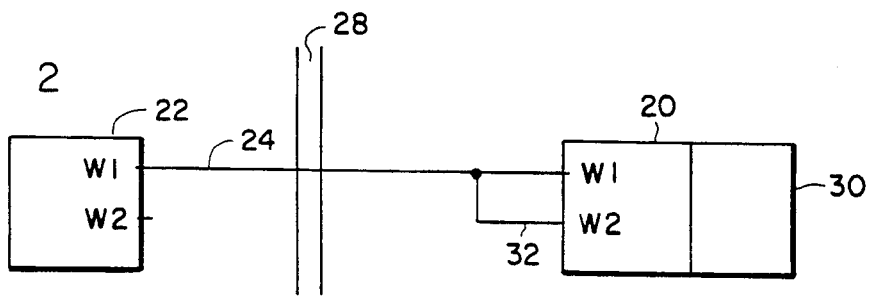
FIG. 5
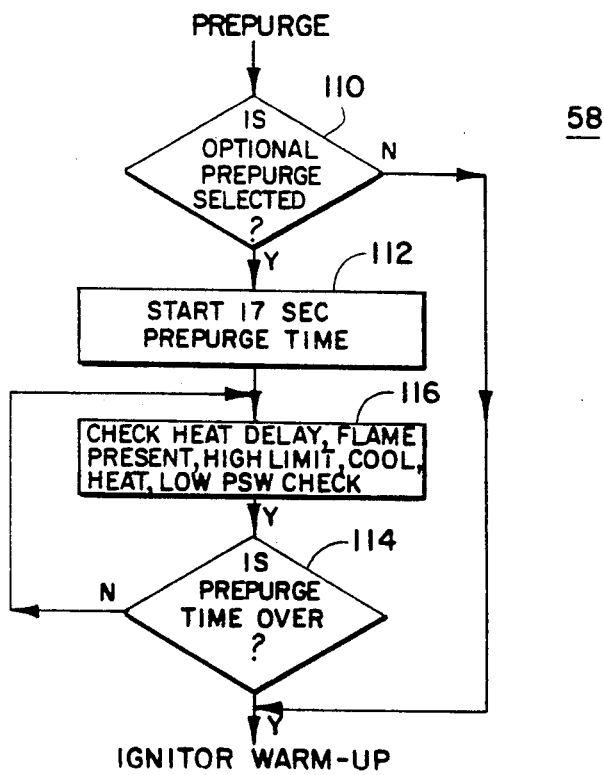

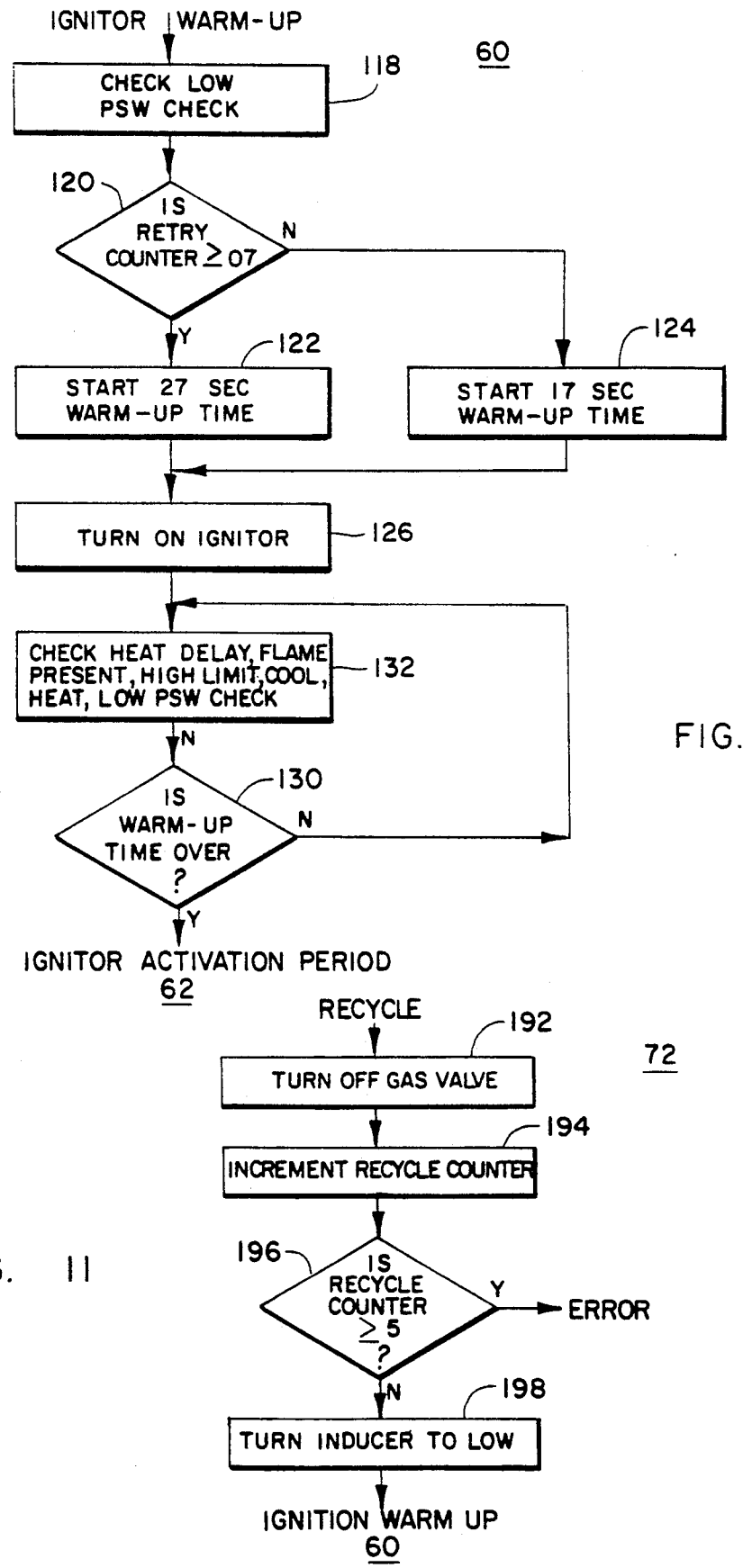

INTEGRATED FURNACE CONTROL

BACKGROUND OF THE INVENTION

This invention is directed to gas furnace controllers, and more particularly, to a gas furnace controller which allows a single stage thermostat to control a two stage furnace. This invention is also applicable to the controllers of the heating and cooling elements of an HVAC system.

In heating applications, a two stage thermostat typically controls a two stage furnace by sending a first call for low heat on a first control line (W1) and a second call for high heat on a second control line (W2). However, under some circumstances, a single stage thermostat is used to control the two stage furnace. Under such circumstances no call for high heat is made on the second control line W2 because the single stage thermostat does not include the capability to issue such a call. Exemplary circumstances include retrofit or upgrade applications where an existing single stage thermostat is retained when the original single stage furnace is replaced with a two stage furnace. However, the two stage furnace cannot operate its second stage unless the furnace recognizes that the furnace is under the control of a single stage thermostat, and unless the furnace recognizes when to operate the second furnace stage.

SUMMARY OF THE INVENTION

It is an object, feature and an advantage of the present invention to solve the problems with prior art HVAC systems.

It is an object, feature and an advantage of the present invention to provide a controller which configures itself to one of several operating modes based on the simultaneous reception of a signal at two predetermined inputs.

It is an object, feature and an advantage of the present invention to provide a two stage furnace which operates under the control of a single stage thermostat.

It is an object, feature and an advantage of the present invention to provide a two stage furnace which operates both heating stages based upon a single call for heat.

It is an object, feature and an advantage of the present invention to provide a two stage furnace which can recognize situations where a controlling thermostat does not have the capability to make high heat calls.

It is a further object, feature and an advantage of the present invention to provide the two stage furnace with the capability to control the operation of the second stage based upon heating calls for the first stage.

It is an object, feature and an advantage of the present invention to provide a two stage furnace that recognizes the simultaneous calls for high and low heat as an indication that a single stage thermostat is controlling the furnace.

It is an object, feature and an advantage of the present invention to connect the W1 and W2 control lines together for a two stage furnace and automatically configure the furnace controller to operate the furnace as a two stage furnace if signals received on the W1 and W2 control lines are essentially simultaneous.

It is a further object, feature and an advantage of the present invention to provide automatic furnace self configuration based on the signal timing of the W1 and W2 control lines.

It is a still further object, feature and an advantage of the present invention to automatically configure the furnace as a one stage controller based on a signal received only on the W1 control line, as a two stage controller based upon a signal received only on the W2 control line, and as a two stage or speed controller based upon a simultaneous signal received on both the W1 and W2 control lines.

It is an object, feature and an advantage of the present invention to initially start a two speed furnace on high speed to overcome bearing friction and thereafter switch to low speed operation.

The present invention provides an HVAC controller including a first input; a second input; first means, responsive to a first signal received on the first input, for generating a first mode of operation; second means, responsive to a second signal received on the second input, for generating a second mode of operation; and third means, responsive to a third signal received substantially simultaneously on the first and second inputs, for generating a third mode of operation.

The present invention also provides a furnace system. The system includes a furnace having a first stage and a second stage; and a furnace controller operably connected to and controlling the furnace. The furnace controller has a first input for initiating the operation of the first furnace stage, and a second input for initiating the operation of the second furnace stage. The system also includes a thermostat generating a call for heat; a single control line operably interconnecting the thermostat and the furnace controller; and an electrical short across the first and second furnace inputs to generate a simultaneous electrical signal in response to the single call for heat from the thermostat.

The present invention further provides a method of configuring a two stage furnace in response to signals received on a first control line and a second control line. The method includes the steps of: determining the presence or absence of signals on the first and second control lines; determining if signals received on the first and second control lines are temporally distinct; establishing a first mode of operation in response to a signal on the first control line and the absence of a signal on the second control line; and establishing a second mode of operation in response to substantially simultaneous signals on the first and second control lines.

The present invention still further provides a method of controlling a two stage or two speed HVAC system having a first control input and a second control input. The method includes the steps of: monitoring the first and second control inputs for signals; configuring a first mode of operation based upon the presence of temporally distinct signals received on either or both of the first and second control inputs; operating the HVAC system in the first mode of operation; configuring a second mode of operation based upon the presence of substantially simultaneous signals on the first and second control inputs; and operating the HVAC system in the second mode of operation.

The present invention still further provides a method of starting a furnace including a blower having a high speed and a low speed. The method comprises the steps of determining that heating is called for; initiating operation of the blower high speed; monitoring pressure in the blower; determining that the monitored blower pressure exceeds a predetermined minimum pressure; halting operation of the blower high speed once the blower pressure has met or exceeded the predetermined minimum pressure; initiating operation of the blower low speed while the blower is still rotating from operation of the blower high speed; and operating the furnace.

BRIEF DESCRIPTION OF THE DRAWINGS

FIG. 1A is a block diagram of a two stage prior art system showing the W1 and W2 control line connections between a furnace controller and a thermostat in accordance with the prior art.

FIG. 1B is a block diagram of a one stage prior art system showing the W1 and W2 control line connections between a furnace controller and a thermostat in accordance with the prior art.

FIG. 2 is a block diagram of the W1 and W2 control line connections between a thermostat and a furnace controller in accordance with the present invention.

FIG. 5 is a flow chart showing the pre-purge routine of FIG. 3.

FIG. 6 is a flow chart showing the ignitor warm up routine of FIG. 3.

FIG. 11 is a flow chart showing the recycle portion of FIG. 3.

DETAILED DESCRIPTION OF THE DRAWINGS

Figure 3:
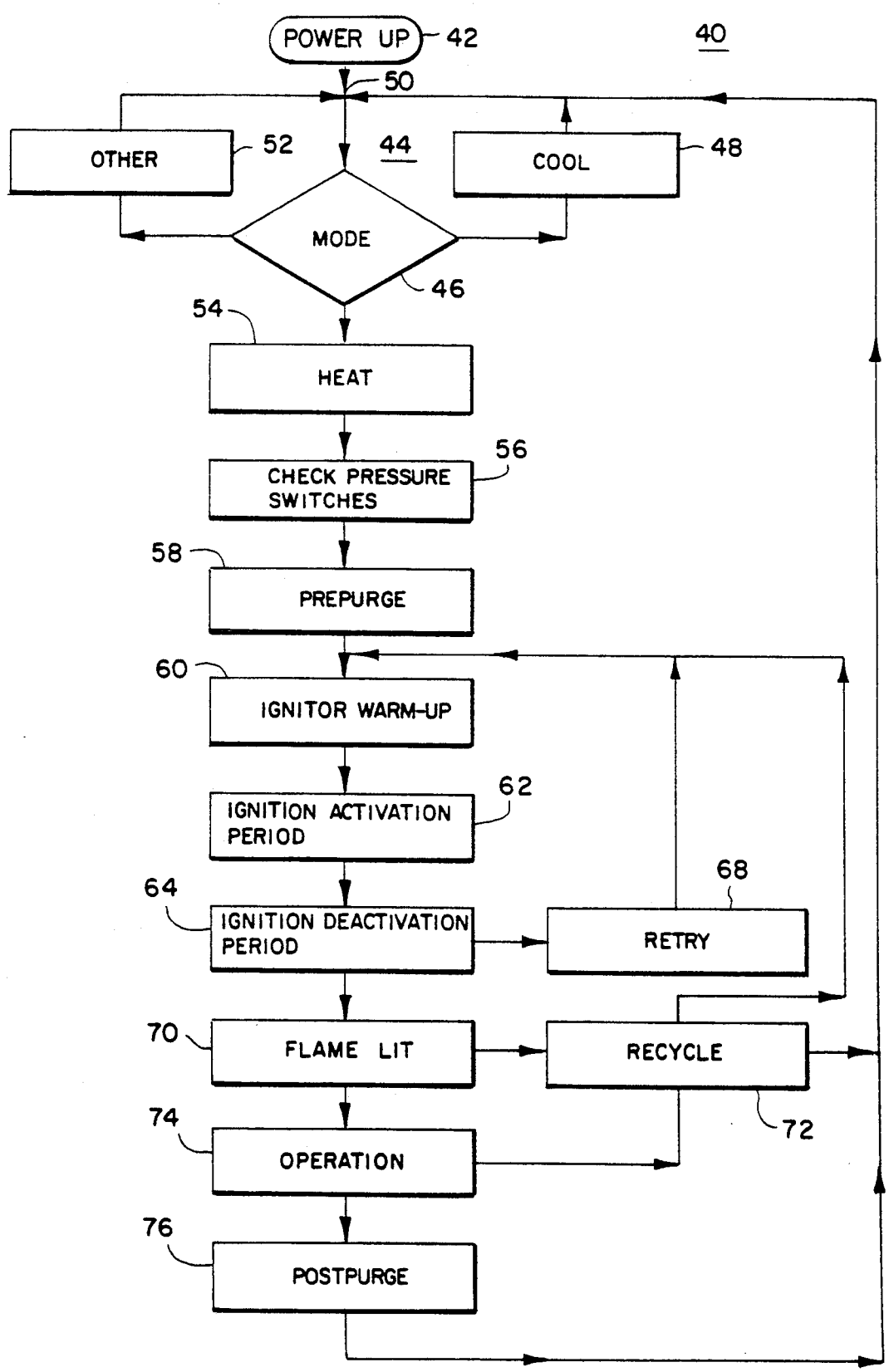
FIG. 3 is a flow chart showing the general operation of an integrated furnace controller of the present invention in accordance with FIG. 2.

FIG. 1A is a block diagram showing a furnace controller 20 and a thermostat 22 connected by two control lines 24 and 26. The control line 24 connects the W1 control output of the thermostat 22 to the W1 control input of the furnace controller 20. The control line 26 connects the W2 control output of the thermostat 22 to the W2 control input of the furnace controller 20. The furnace controller 20 has control inputs W1 and W2. The thermostat 22 has control outputs W1 and W2 corresponding to the furnace controller inputs W1 and W2. These inputs can respectively indicate that first and second furnace speeds are called for or that first and second stages of heating is called for. For purposes of this invention, stages and speeds are used interchangeably. Of course, a person of ordinary skill in the arts will recognize that actual thermostats and furnace controllers are interconnected by more than just W1 and W2 control lines 24 and 26, and that such interconnections might include the Y1, Y2, C, G, and R interconnecting control lines, but such other connections are omitted from the description of the present invention for simplicity. Further, a person of ordinary skill in the art will immediately recognize the applicability of the present invention as described herein to those other control lines particularly including the Y1 and Y2 control lines.

FIG. 1B shows a prior art system wherein a furnace controller 20 controls a signal speed or single stage furnace 21 and therefore only a single control line 24 interconnects with the heating control input W1 of the furnace controller 20 with the heating control outputs W1 and W2 of thermostat 22.

FIG. 2 shows a block diagram of the present invention applied to the thermostat 22 and furnace controller 20. In the present invention only a single control line 24 interconnects the heating control output W1 of the thermostat 22 to the heating control inputs W1, W2 of the furnace controller 20. Such a single control line 24 may be present either by design or in the case of a retrofit application, where only a single control line 24 penetrates a physical barrier 28 between the thermostat 22 and the furnace controller 20. In the present invention, the furnace controller 20 controls a two speed furnace 30 similar to the two speed arrangement shown in FIG. 1A, but does not include the inputs provided to the W2 control input by the control line 26. The present invention addresses this situation by providing an electrical connection 32 between the W1 and W2 control inputs of the furnace controller 20. The furnace controller 20 recognizes that any signal which is received on the W1 and W2 control inputs at essentially simultaneous times indicates that the controller 20 should configure itself to operate in the physical configuration of FIG. 2 using the control strategy specifically discussed in connection with FIG. 15 below.

The furnace controller 20 of the present invention is applicable to all conventional two stage furnaces. Such a gas furnace 310 is subsequently described in connection with FIG. 16 and includes a main gas valve 318, an ignitor 336, a circulating air blower 328 and an induced draft blower 326 (also known as an inducer blower or an inducer blower fan). For purposes of the present invention, the induced draft blower 326 is a two speed blower having a low speed for low heat applications and a high speed for high heat applications. U.S. Pat. Nos. 4,751,910 to Allen et al. and 5,060,722 to Zdenek et al. disclose representative gas furnaces and are assigned to the assignee of the present invention and are hereby incorporated by reference. The present invention is also applicable to the heating portions of conventional HVAC systems.

FIG. 3 is a flow chart 40 showing the overall operation of the furnace controller 20 of the present invention. The flow chart 40 starts at initial power up 42 and then enters a mode of operation determining loop 44 which determines at step 46 whether there is a call for cooling, a call for heating, or a call for some other mode of operation. If there is a call for cooling, then cooling is conventionally implemented at step 48 and the loop 44 is reentered at point 50. Similarly, if there is a call for some mode of operation other than heating or cooling, this other mode of operation is implemented or invalidated at step 52 and the loop 44 reentered at the point 50. If the mode of operation determining step 46 determines that a call for heat has been made, as reflected by a signal on either the W1 or W2 control inputs, then a pressure switch check routine is entered at step 56 to ensure that the high and low pressure switches 342 are operational. Initially, the inducer blower 326 is then turned on high to provide high starting torque, after which the inducer blower 326 is turned on low for the pre-purge operation of step 58. The details of the pressure switch check step 58 are further described below in connection with FIG. 4, while the pre-purge operation step 58 is described below in connection with FIG. 5.

After the pre-purge step 58, an ignitor 336 is warmed up at step 60 as further described below in connection with FIG. 6. Next, at step 62, the ignitor 336 is activated in an ignition activation period further described below in connection with FIG. 7. Following the expiration of a predetermined ignition activation period, the ignitor 336 is deactivated at step 64 as further described in connection with FIG. 8. If flame is not present, at least one retry attempt is made at step 68, as is further described in connection with FIG. 9. If flame was determined to be present, then preparation for normal operation is made at step 70 in a flame lit period further described below in connection with FIG. 10. Further checks for the presence of a flame are made during the flame lit period 70 and a recycle step 72 is entered should the flame be determined to be out. The recycle step is further described below in connection with FIG. 11. Upon the completion of the flame light period 70 with the flame still present, the normal operating loop is entered at step 74. This loop is shown in further detail in connection with FIG. 12 and this loop continues for as long as there is a call for heat and flame is present. Once there is no longer a call for heat, the normal operating loop 74 is exited to a post purge step 76 described in more detail in connection with FIG. 13 below. Following the post-purge step 76 the mode of operation determining loop 44 is re-entered at point 50.

Figure 4:
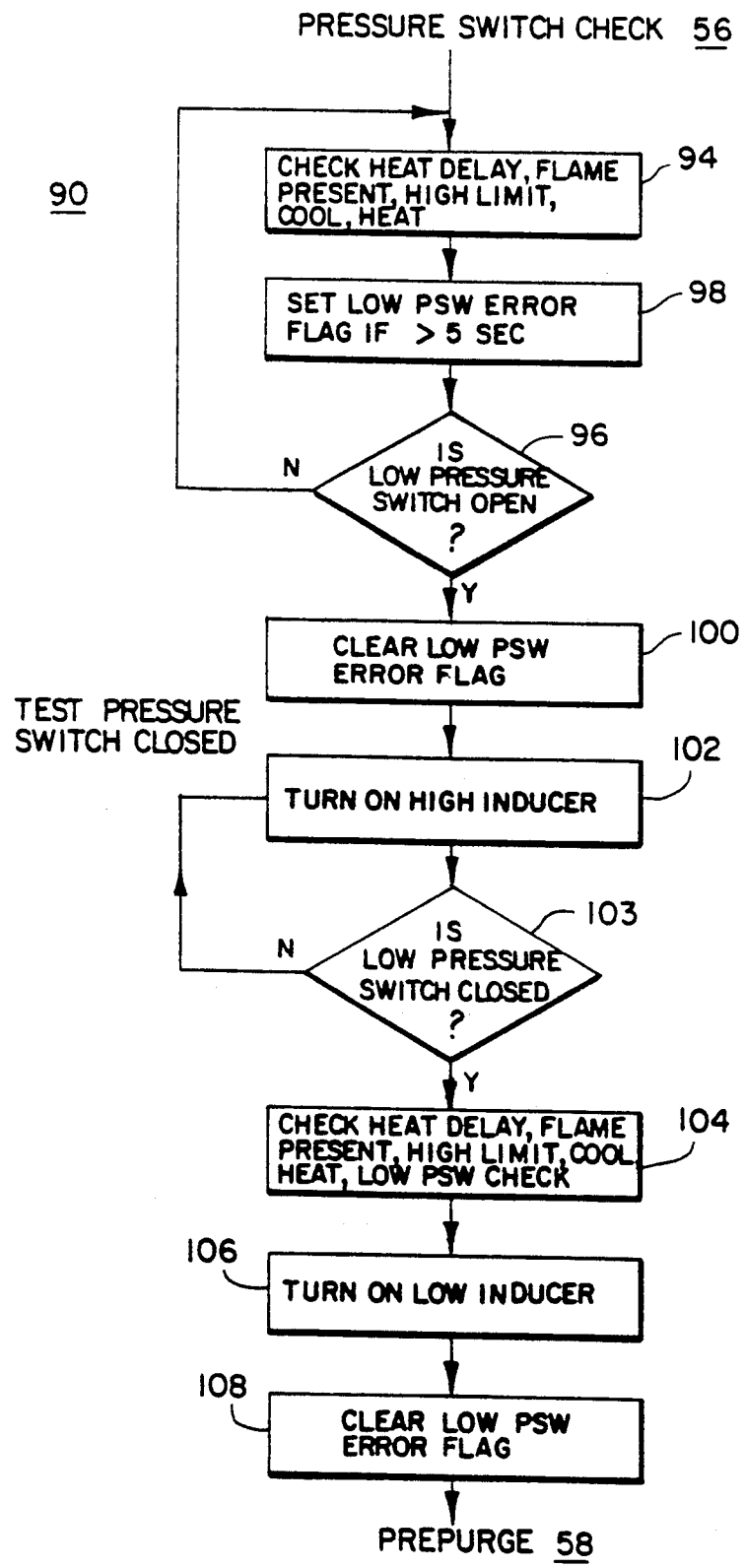
FIG. 4 is a flow chart showing the pressure switch check routine of FIG. 3.
Figure 15:
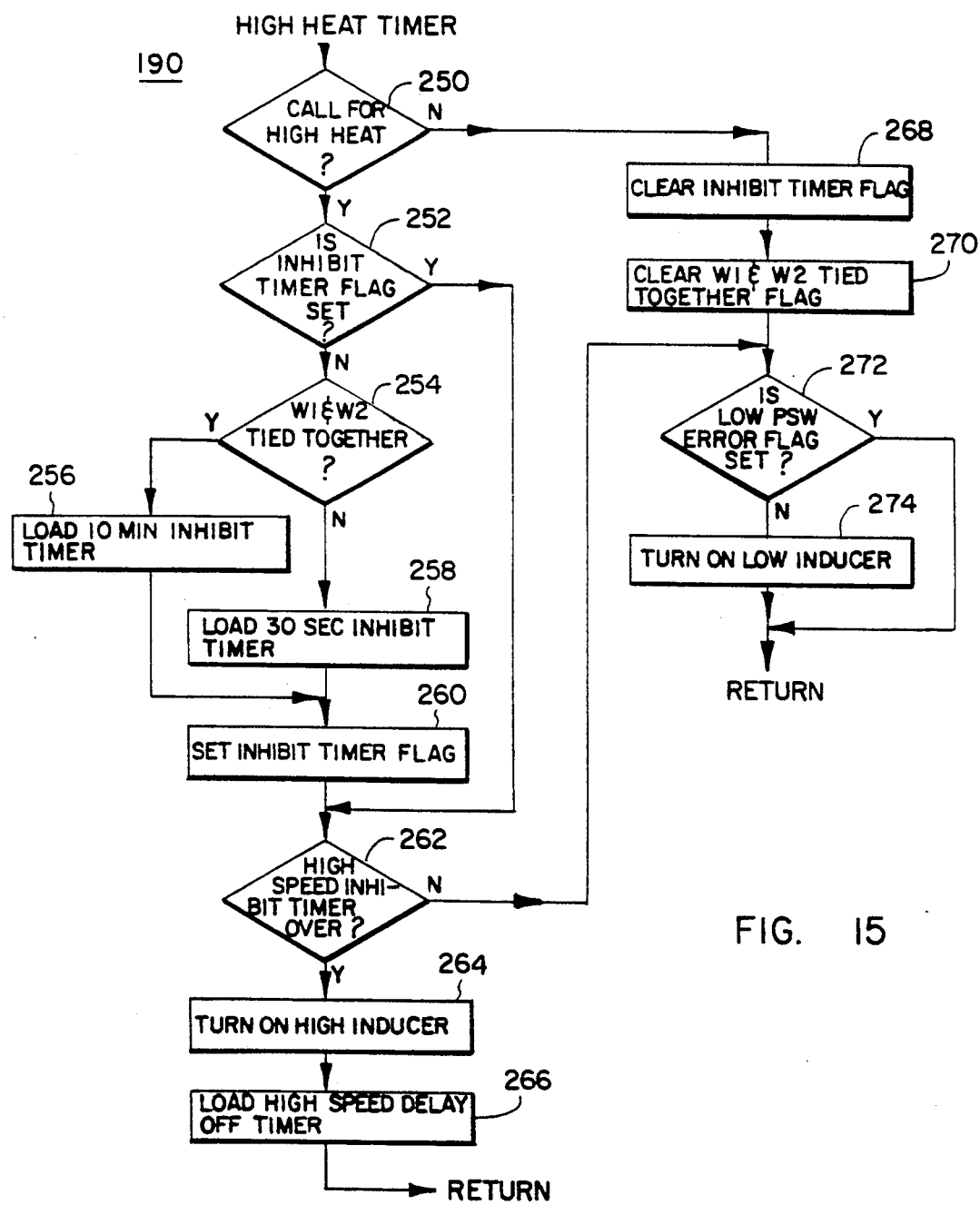
FIG. 15 is a flow chart showing the high heat timer subroutine called in the flow charts shown in FIGS. 10, 12 and 13.

FIG. 4 illustrates the pressure switch check 56. Initially a loop 90 is entered and the heat delay routine 92 described below in connection with FIG. 15 is executed at step 94. Additionally checks are made to verify that there is no flame present, that the high limit has not been exceeded, and that the call is for heat and not for cooling. A check is continually made at step 96 to determine if the low pressure switch is open and the low pressure loop 90 is executed until that low pressure switch opens. If the low pressure switch 342 does not open within five seconds, an error flag is set at step 98 and the furnace controller 20 takes appropriate action. Once the low pressure switch 342 is determined to be open at step 96, the error flag of step 98 is cleared at step 100 and the inducer blower fan's high speed is turned on at step 102 to provide high starting torque. The sufficiency of the starting torque is determined at step 103 by monitoring a low pressure switch in the blower 326. The closing of the low pressure switch 342 is an indication that the blower has generated a minimum amount of pressure by rotation at the high blower speed. Once the starting torque has been overcome as is discussed subsequently in connection with step 106, the blower 326 will be switched from the high speed to the low speed while the blower wheel is still turning. At step 104 the heat delay subroutine 92 is executed as well as checks for flame, high limit, cooling, heat, and verification that the low pressure switch flag has been cleared. The flame present subroutine is well known and essentially verifies the absence of a flame. The heat and cool subroutines are also well known and verify that a call is being made for heating and not for cooling. The low PSW check verifies that minimum pressures are present by checking the status of the low pressure switch 342. Similarly, the high limit subroutine verifies that a high pressure limit is not exceeded. Once the inducer blower 326 has been started and the initial bearing friction overcome by the use of the high speed of the inducer blower 326, the operation of the inducer blower 326 is switched to low speed at step 106 and the pressure switch error flag is again cleared at step 108. The pre-purge step 58 is then entered.

The pre-purge step 58 is shown in FIG. 5. Initially at step 110 a check is made to see if pre-purge is desired. If no pre-purge is desired, the ignitor warm up step at 60 is immediately entered. If pre-purge is desired at step 110, then a 17 second timer is set at step 112 and counted down at step 114. During this 17 second count down time, the heat delay subroutine 92 is executed and checks are made for flame presence, high limit, call for heat, call for cool and low pressure switch check. Once the pre-purge time has expired as determined by step 114, the ignitor warm up step 60 is entered.

The ignitor warm up step 60 as shown in FIG. 6. Initially at step 118 a check is made that the low pressure switch 342 is okay, and at step 120 a check is made to see if the furnace controller 20 is in the retry mode established by retry step 68. If in the retry mode, a 20 second warm up time is set by step 122, while if not in the retry mode a 17 second warm up time is set at step 124. After the warm up time is established at steps 122 or 124, the ignitor 336 is turned on at step 126. Step 130 then counts down the warm up time while constantly checking at step 132, the heat delay subroutine, and the presence of flame, or high limit, cool, heat, and a low pressure switch violations. When step 130 determines that the ignitor warm up time has expired, the ignition activation period step 62 is entered.

Figure 7:
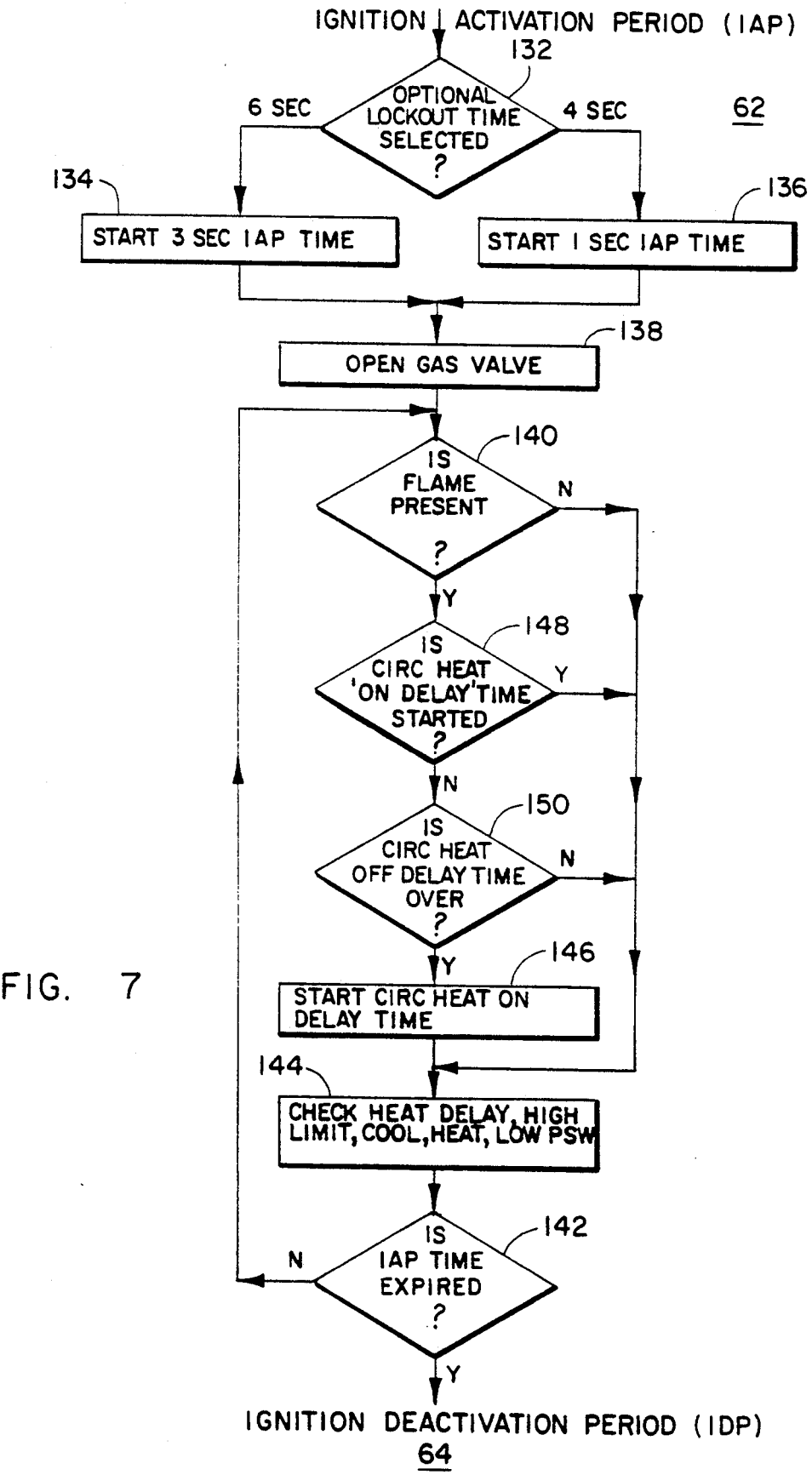
FIG. 7 is a flow chart showing the ignition activation routine of FIG. 3.

The ignition activation step 62 is shown in FIG. 7 and involves an initial determination at step 132 as to which length of ignition activation period to use. Depending upon the user's preference, a three second ignition activation period is selected at step 134 or a one second ignition activation period is set at step 136. After the selection of the ignition activation period at step 134 or 136, the main gas valve 332 is opened at step 138, and a flame present check is made at step 140. Until flame is found to be present at step 142, the ignition activation period selected at steps 134 and 136 is counted down while continuously executing the heat delay subroutine 92 and checking high limit, cool, heat, and low and high pressure switch operation at step 144. Once flame has been verified at step 140, a check is made that the circulating fan "heat on delay" time set at step 146 has been counted down at step 148. An additional check is made at step 150 to verify that an "off delay" timer for the circulating fan has not been set. Once the ignition activation period has been verified to expire at step 142, the ignition deactivation period 64 is entered.

Figure 8:
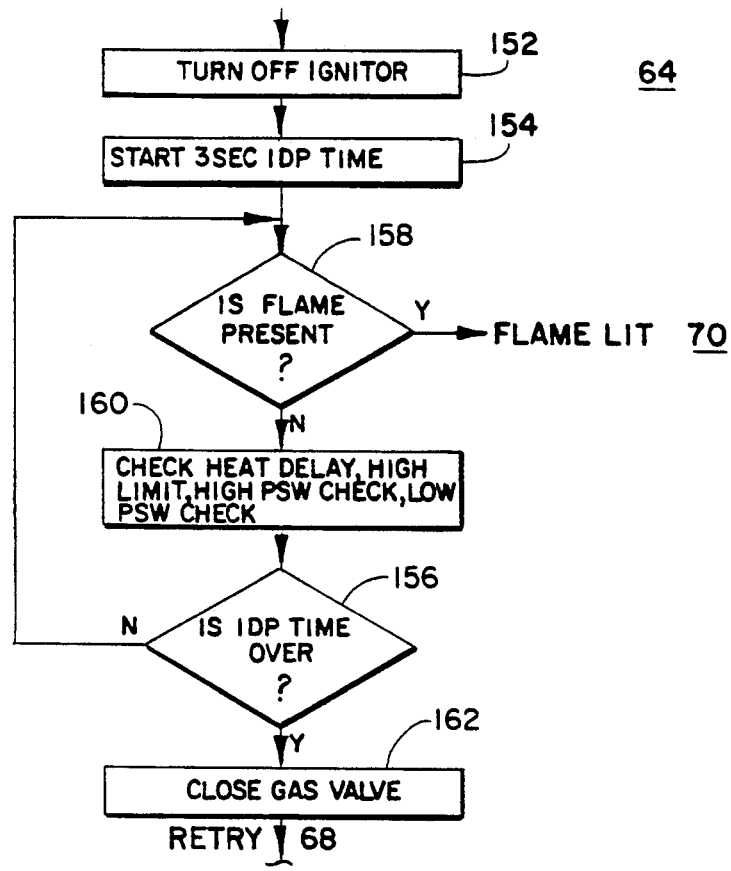
FIG. 8 is a flow chart showing the ignition deactivation portion of FIG. 3.
Figure 9:
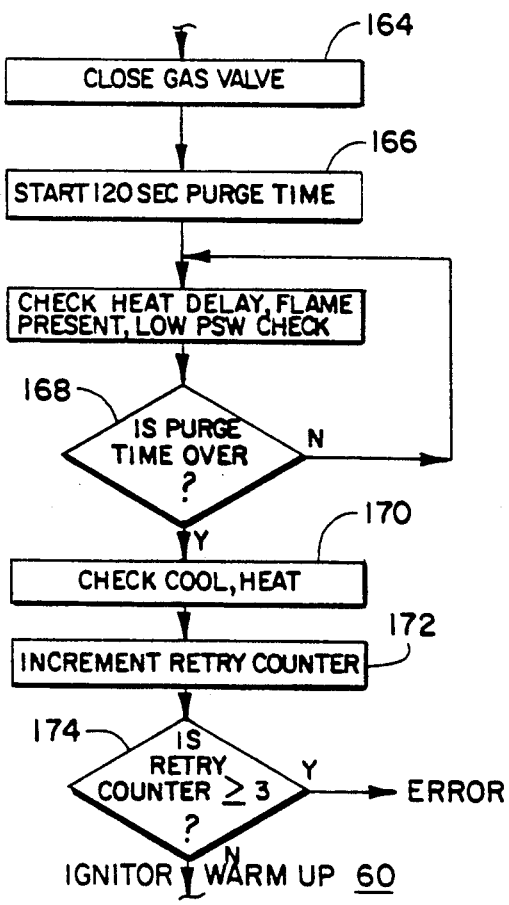
FIG. 9 is a flow chart showing the retry portion of FIG. 3.

FIG. 8 shows the ignition deactivation step 64 which commences by turning off the ignitor at step 152 and setting a three second ignition deactivation period timer at step 154. Until the ignition deactivation period is verified to expire at step 156, a check is made for the presence of a flame at step 158. While counting down the ignition deactivation period time continuous checks are made by executing the heat delay subroutine 92 and verifying high limit, high pressure switch and low pressure switch operation at step 160. If the ignition deactivation period expires without the presence of a flame, the main gas valve 332 is closed at step 162 and the retry step 68 is entered. FIG. 9 shows the retry step 68 which initially closes the gas valve 332 at step 164 starts a 120 second purge time at step 166, and then counts down that purge time at step 168. While counting down the purge time the heat delay subroutine is executed and checks are made for the presence of flame and the operation of the low pressure switch. Once the purge time is over, a check is made for heating and cooling calls at step 170. The retry counter is incremented at step 172, and, if three or less in value, the ignitor warm up step 60 is entered from step 174. If the retry counter is greater than three, an error condition is determined. However, if flame is verified to be present at step 158 then the flame lit routine at step 70 is entered.

Figure 10:
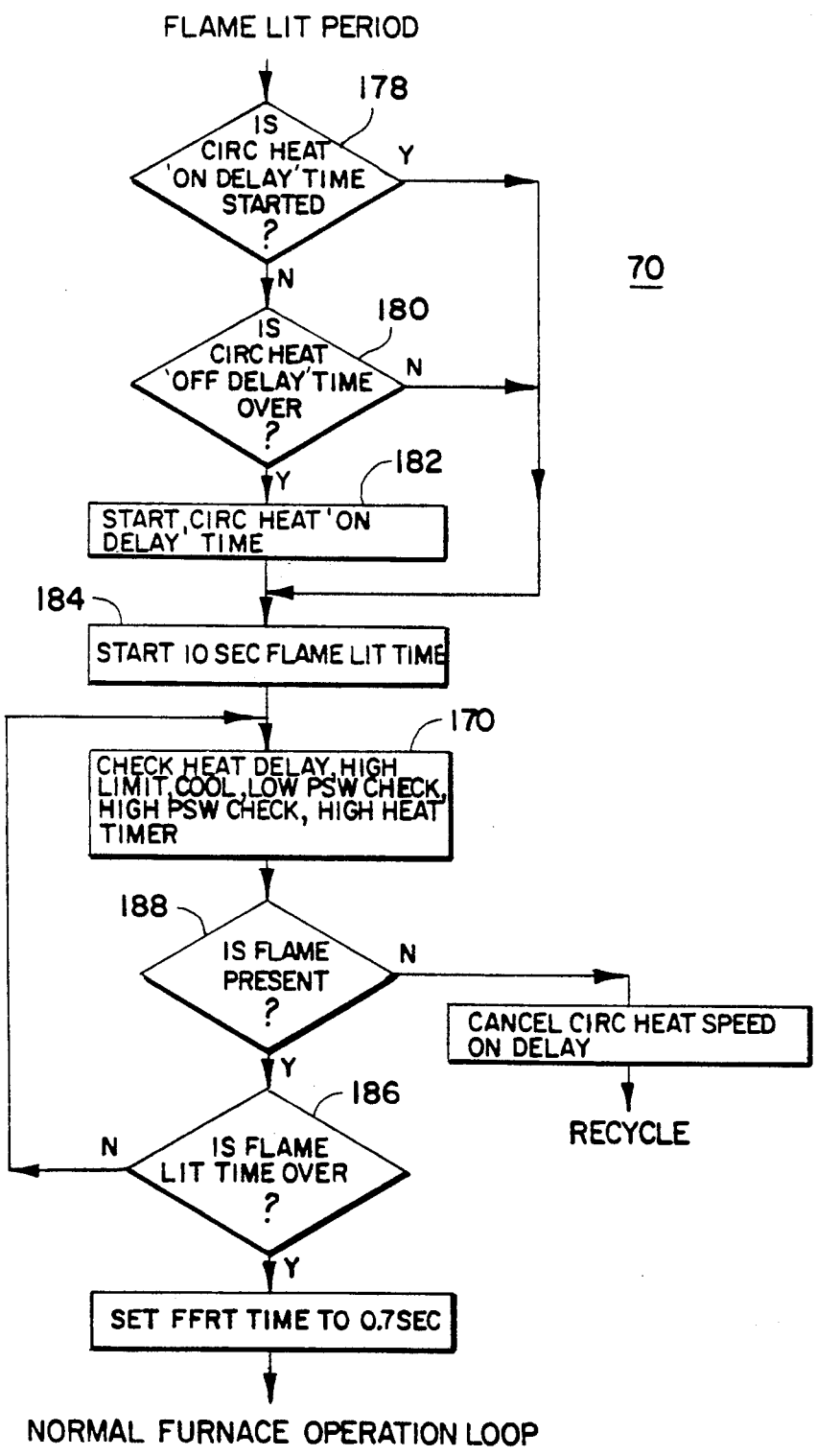
FIG. 10 is a flow chart showing the flame light initialization portion of FIG. 3.

Once the flame has been determined to be present at step 158 the flame light step 70 of FIG. 10 is entered. "On delay" and "off delay" times are checked respectively at steps 178 and 180 and the "on delay" timer is set at step 182 if neither timer is already running. A flame light timer is set at step 184 to verify that the flame has remained on for a specific period of time. The flame light timer is counted down at step 186 and the flame is constantly checked at step 188 to verify that the flame remains on. If the flame is determined at step 188 to go out, then the recycle of step 72 is entered. While in the flame light time check, the heat delay routine is executed and checks are made for high limit, cool, heat, calls for operation, low and high pressure switch check and a call is made to the high heat timer routine 190 shown in greater detail in FIG. 15 below. Once step 186 has verified that the flame light timer has been on for ten second, the normal furnace operating loop 74 is entered.

FIG. 11 shows the recycle step 12 which essentially turns off the gas valve 332 at step 192, increments a recycle counter 194 and initiates an error condition if the recycle counter exceeds 5 or more recycles at step 196. If the recycle counter is less than five, the inducer blower fan 326 is turned on low speed at step 198 and the ignitor warm up step 60 is entered.

Figure 12:
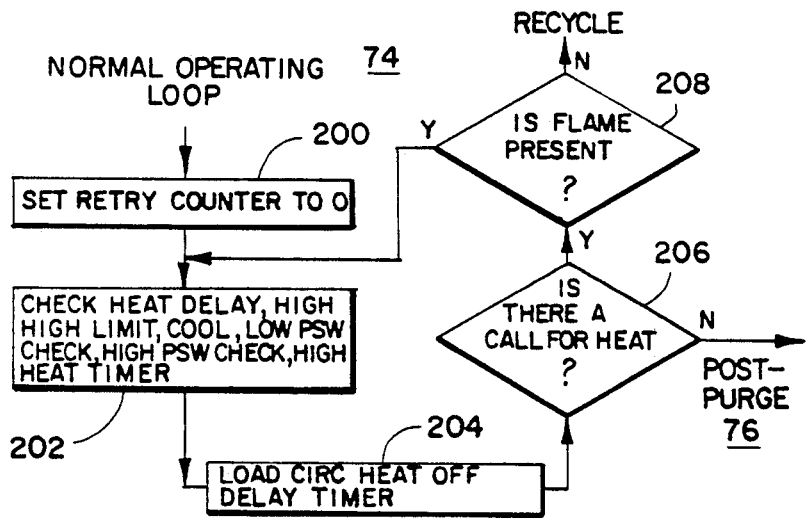
FIG. 12 is a flow chart showing the normal furnace operating loop portion of FIG. 3.

FIG. 12 shows the normal furnace operating loop 74 which initially clears the retry counter at step 200. The normal operating loop consists of four steps 202, 204, 206 and 208. These steps are sequentially executed as long as step 208 determines that there is a flame present and step 206 determines that there is a call for heat. Step 202 verifies that heat delay, high limit, cool, low and high pressure switch checks are okay and also checks the high heat timer routine 190, while step 204 resets the "off delay" timer. If flame is determined to be out at step 208, the recycle step 72 is entered. Otherwise the normal operating loop continues until there is no longer a call for heat at step 206 whereupon the post-purge step 76 is entered.

Figure 13:
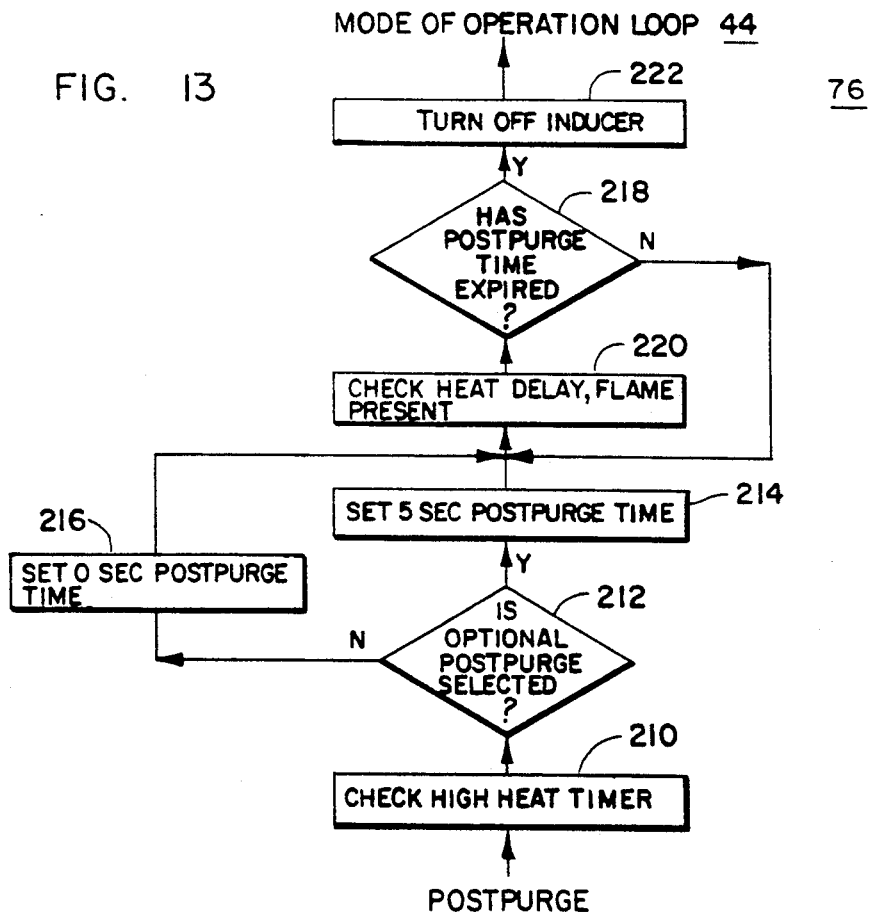
FIG. 13 is a flow chart showing the post purge portion of FIG. 3.

FIG. 13 shows the post-purge step 76 which initially checks the high heat timer routine 190 at step 210. At step 212 the determination is made as to whether a post-purge time should be set and if so it is set at five seconds at step 214 or, if not, at zero at step 216. The post-purge time is counted down at step 218 with checks of the heat delay routine of FIG. 14 and for the presence of flame at step 220. Once the post-purge time expires at step 218, the inducer blower fan 326 is turned off at step 222 and the mode of operation determining loop 44 is reentered at point 50.

Figure 14:
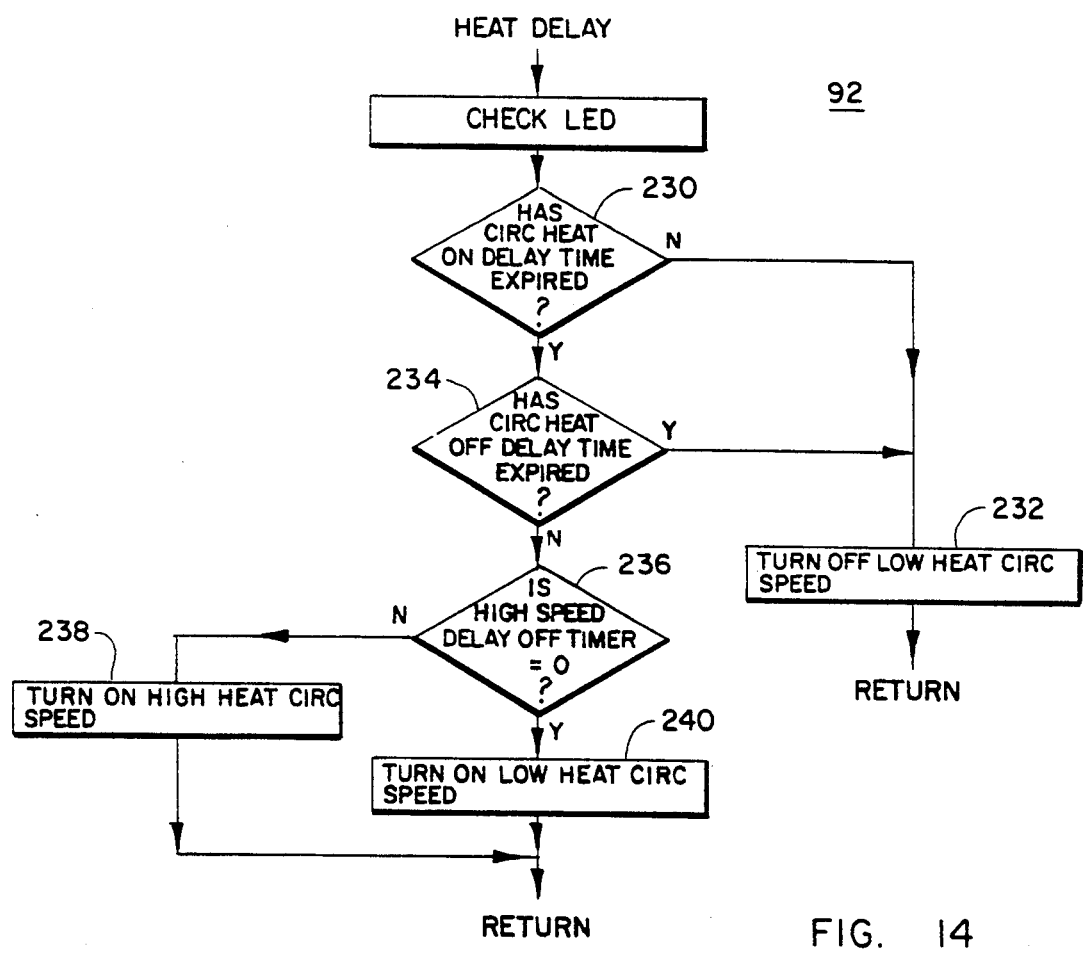
FIG. 14 is a flow chart showing the heat delay portion of FIGS. 4, 5, 6, 7, 8, 9, 12, and 13.

FIG. 14 shows the heat delay routine 92 which checks at step 230 whether the circulating blower fan heat "on delay" time is expired and if so turns off the low speed circulating blower fan at step 232. If the "on time" has not expired at step 230, a check is made at step 234 as to whether an "off delay" time has expired. If the "off delay" circulating blower heat "off delay" time has expired at step 234, step 232 is executed. However, if the "off delay" time is not expired, a check is made to see if the high speed delay timer is zero at step 236. If there is no high speed delay time active, then the high speed circulating blower fan 328 is turned on at step 238 else the low speed circulating blower fan 328 is turned on at step 240. In either case a return is made to the calling routine.

The high heat timer routine 190 is shown in FIG. 15. At step 250 a check is made to see if there is a call for high heat, if so, a check is made at step 252 to see whether high speed is inhibited and, if not, a check is made at step 254 to see if the W2 and W1 control lines are tied together. This is done by comparing the time at which signals are received on those control lines to see if they are essentially simultaneous. Preferably, the signals are also checked to ensure that the signals themselves are the same signal. If the W1 and W2 control lines have been shorted, the furnace controller 20 configures itself to a timed two stage or a timed two speed mode of operation. The timed two speed or two stage mode of operation initiates low speed operation and delays high speed operation for a predetermined period of time. If the call for heating still exists after the expiration of the predetermined time period, high speed operation is initiated. High speed operation is preferably continued until the call for heat is satisfied.

In the preferred embodiment, the high speed operation is inhibited through the use of a ten minute timer at step 256 otherwise conventional operation is allowed at step 258 by loading a thirty second high speed inhibit timer. An inhibit timer flag is set at step 260, that flag being continuously checked at step 252 to prevent the inhibit timer itself from being reset. Once the high speed inhibit timer expires as determined by step 262 the high inducer blower fan 326 is turned on at step 264 and a off delay timer for high speed operation is set at step 266. If no call for high heat was found at step 250, the inhibit timer flag is cleared at step 268, and a W1, W2 tied together flag is cleared at step 270. This also has the effect of verifying the continuity of signals on the W1 and W2 control lines during the time while the high speed operation is inhibited. If there is no low pressure switch error as determined at step 272 the low speed inducer blower fan is turned on at step 274. Either result of step 272 will result in a return to the calling routine.

Figure 16:
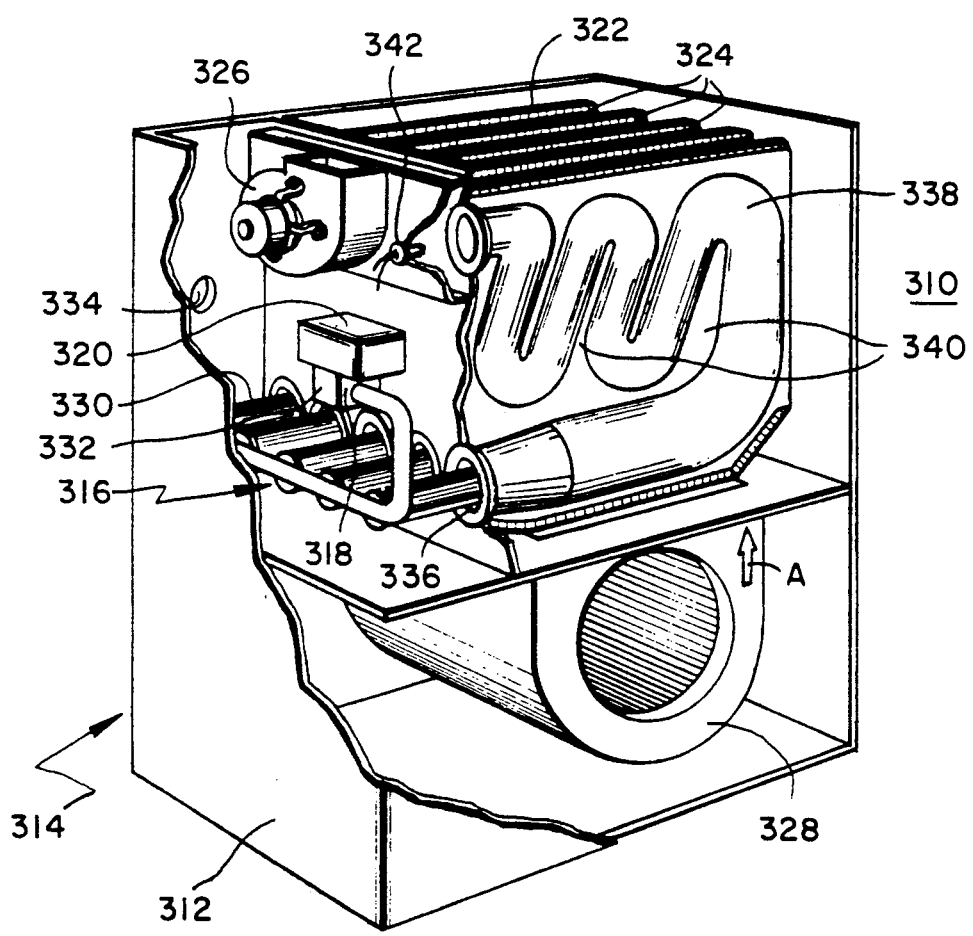
FIG. 16 is a cutaway view of a gas furnace to which the present invention applies.

FIG. 16 shows a gas furnace 310 including a cabinet 312; a combustion system 314 including a burner assembly 316, a gas valve assembly 318 and a control assembly 320; a heat exchanger assembly 322 including a plurality of heat exchangers 324; an induced draft blower 326; and a circulating air blower 328. The circulating air blower 328 blows air in the direction indicated by arrow A. Although described as an upflow furnace, the gas furnace 310 of the present invention also applies to other conventional gas furnace types including horzontal and down flow gas furnaces.

The burner assembly 316 of the gas furnace 310 includes a plurality of inshot burners 330 manifolded to a supply of fuel gas. The gas valve assembly 318 includes a gas valve 32 which controls the gas supply so that an appropriate air fuel mixture is provided to the burners 330. The air for the air fuel mixture enters through an air inlet 334. Each burner assembly 316 includes a hot surface ignitor 336 to ignite the air fuel mixture. Each burner 330 directs the resultant combustion into one of the plurality of heat exchangers 324. Each burner 330 is in one-to-one correspondence to a particular heat exchanger 324. The heat exchanger 324, as described more completely below, includes a serpentine passage 338 which provides maximum heat exchange with forced air from the circulating air blower 328 passing between the plurality of heat exchangers 24 and in the interstices 340 formed by the serpentine passage 338. The induced draft blower 326 pulls the flue gases resulting from combustion through the heat exchangers 324 and vents them to a chimney, a vent or the like (not shown). The induced draft blower 326 includes a low pressure switch 342 providing a signal to the furnace controller 20. A high pressure switch is also included but not shown. The furnace controller 20 also controls the operation of the induced draft blower 326, the circulating air blower 328, and the control assembly 320.

What has been described is a method for configuring a controller to a first mode of operation based on a signal received at a first input, to a second mode of operation based on a signal received at a second input, and a third mode of operation based on a signal received substantially simultaneously at both the first and second inputs. Also described is a method for operating a two stage furnace using only a single control line. It will be readily apparent that many modifications and alterations are contemplated including the application of this invention to residential cooling using the Y1 and Y2 control lines to control a two speed compressor or a two compressor system. All such modifications and alterations are contemplated to be within the spirit and scope of the following claims.

What is claimed for Letters Patent of the United States is:

1. An HVAC controller comprising a controller including:
   a first input;
   a second input;
   first means, responsive to a signal received on the first input, for generating a first mode of operation;
   second means, responsive to a signal received on the second input, for generating a second mode of operation; and
   third means, responsive to the substantially simultaneously receipt of a signal on the first and second inputs, for generating a third mode of operation.

2. The HVAC controller of claim 1 wherein the controller is a furnace controller, the first mode of operation is single stage or single speed cooling or heating, the second mode of operation is two stage or two speed cooling or heating, and the third mode of operation is timed two stage or timed two speed cooling or heating.

3. The HVAC controller of claim 2 wherein the first input is the W1 control line and the second input is the W2 control line.

4. The HVAC controller of claim 2 wherein the first input is the Y1 control line and the second input is the Y2 control line.

5. A furnace system comprising:
   a furnace having a first stage and a second stage;
   a furnace controller operably connected to and controlling the furnace, the furnace controller having a first input for initiating the operation of the first furnace stage and a second input for initiating the operation of the second furnace stage;
   a thermostat including means to generate a call for heat;
   a single control line operably interconnecting the thermostat and the furnace controller;
   an electrical short across the first and second furnace inputs to generate a simultaneous electrical signal in response to the call for heat from the thermostat; and
   means, operably associated with the furnace controller, for automatically configuring itself to a mode of operation depending upon the timing of signals received at the first and second control inputs.

6. The system of claim 5 wherein the configuring means includes first means for establishing a first mode of operation in response to a single signal on the first control input, second means for establishing a second mode of operation in response to essentially simultaneous signals on the first and second control inputs, and a third means for establishing a third mode of operation in response to temporally distinct signals on the first and second control inputs.

7. The system of claim 6 wherein the first control input is the W1 line and the second control input is the W2 control input.

8. The system of claim 7 further including means, responsive to the third establishing means, for delaying operation of the second furnace stage after the initiation of the first furnace stage.

9. A method of controlling a two stage or two speed HVAC system having a first control input and a second control input comprising the steps of:
   monitoring the first and second control inputs for signals;
   configuring a first mode of operation based upon the presence of non-simultaneous signals received on either or both of the first and second control inputs;
   operating the HVAC system in the first mode of operation;
   configuring a second mode of operation based upon the presence of substantially simultaneous signals on the first and second control inputs; and
   operating the HVAC system in the second mode of operation.

10. The method of claim 9 wherein the second mode of operation operating step includes the further steps of:
    initiating a first speed or stage of the HVAC system operation in response to the substantially simultaneous signals;
    delaying operation of a second speed or stage of the HVAC system for a period of time;
    monitoring the first and second control inputs; and
    initiating the second speed or stage of the HVAC system if the period of time expires and the substantially simultaneous signals are being received at the first and second control inputs.

11. The method of claim 9 wherein the monitoring step includes the further step of verifying the continuity of the substantially simultaneous signals during a period of time.

12. The method of claim 11 including the further step of verifying that the substantially simultaneous signals are also substantially identical.

13. The method of claim 12 wherein the period of time is a predetermined period of time.

14. A method of configuring a two stage furnace in response to signals received on a first control line and a second control line comprising the steps of:
    determining the presence or absence of signals on the first and second control lines;

determining if signals received on the first and second control lines are non-simultaneous;

establishing a first mode of operation in response to a signal on the first control line and the absence of a signal on the second control line; and establishing a second mode of operation in response to substantially simultaneous signals on the first and second control lines.

* * * * *

UNITED STATES PATENT AND TRADEMARK OFFICE
CERTIFICATE OF CORRECTION

PATENT NO. : 5,271,556
DATED : December 21, 1993
INVENTOR(S) : Robert W. Helt, Carl L. Garrett and James T. VerShaw It is certified that error appears in the above-identified patent and that said Letters Patent is hereby corrected as shown below:

In claim 5, column 9, line 64, please insert "control" before --input--.

In claim 5, column 9, line 65, please insert "control" before --input--.

Signed and Sealed this

Twenty-eighth Day of June, 1994

Attest:

BRUCE LEHMAN

Attesting Officer     Commissioner of Patents and Trademarks